United States Patent [19]

Kim et al.

[11] Patent Number: 5,751,400
[45] Date of Patent: May 12, 1998

[54] CONVERSION SYSTEM FOR A CAMERA

[75] Inventors: Myeong-kyu Kim; Seong-doo Hong. both of Changwon-si, Rep. of Korea

[73] Assignee: Samsung Aerospace Industries, Ltd., Changwon-si, Rep. of Korea

[21] Appl. No.: 226,947

[22] Filed: Apr. 13, 1994

[30] Foreign Application Priority Data

Apr. 16, 1993 [KR] Rep. of Korea ............ 93-6448
Apr. 26, 1993 [KR] Rep. of Korea ............ 93-7007

[51] Int. Cl.⁶ ............................. G03B 17/02; G03B 37/00
[52] U.S. Cl. ............................................... 354/159; 354/94
[58] Field of Search ........................... 354/94, 159, 222, 354/223, 199

[56] References Cited

U.S. PATENT DOCUMENTS

| | | | |
|---|---|---|---|
| 3,581,644 | 6/1971 | Baker | 95/44 |
| 4,251,149 | 2/1981 | Kimura | 354/222 |
| 4,716,427 | 12/1987 | Shyu | 354/159 |
| 5,066,971 | 11/1991 | Kodaira | 354/465 |
| 5,086,311 | 2/1992 | Naka et al. | 354/195.1 |
| 5,227,824 | 7/1993 | Yoshida et al. | 354/159 |
| 5,258,790 | 11/1993 | Tanaka | 354/94 |
| 5,298,929 | 3/1994 | Tsunefuji et al. | 354/159 |
| 5,307,111 | 4/1994 | Kurei | 354/402 |
| 5,325,140 | 6/1994 | Torikoshi et al. | 354/159 |
| 5,335,031 | 8/1994 | Ogawa | 354/159 |
| 5,345,285 | 9/1994 | Hasushita et al. | 354/159 |
| 5,367,351 | 11/1994 | Suzuka | 354/159 |
| 5,412,443 | 5/1995 | Suzuka | 354/94 |

FOREIGN PATENT DOCUMENTS

| | | |
|---|---|---|
| 545701 | 2/1993 | Japan. |
| 5188431 | 7/1993 | Japan. |
| 1438161 | 6/1976 | United Kingdom. |
| 2264179 | 8/1993 | United Kingdom. |

*Primary Examiner*—Safet Metjahic
*Assistant Examiner*—Nicholas J. Tuccillo
*Attorney, Agent, or Firm*—McAulay Fisher Nissen Goldberg & Kiel, LLP

[57] ABSTRACT

The conversion system for a camera employs a conversion lever disposed at the outer side of a camera body to select a given photographic mode without need to open the camera. The conversion lever is used to shift a cam plate which is located within the camera body in order to effect vertical movement of two panorama curtains within the camera body. The cam plate may be moved into one of three positions, namely a normal photographic mode position, a first photographic mode position and a second photographic mode position. A first operating lever is actuated by the cam plate to move one panorama curtain vertically while movement of the first panorama curtain causes movement of the second panorama curtain via a second operating lever.

21 Claims, 11 Drawing Sheets

CONVERSION SYSTEM FOR A CAMERA

BACKGROUND OF THE INVENTION

(1) Field of the Invention

The present invention relates to a conversion system for a camera. More particularly, this invention relates to a conversion system for converting a photographic mode for use for taking normal photographs, high vision photographs and panoramic photographs.

(2) Description of the Prior Art

As is known, panorama-type cameras are those which have an extremely wide visual field. Typically, the panorama-type camera can be classified in two types, such as lens-rotary type and reflector-rotary type. The lens-rotary type camera usually has a horizontal angle of 100° to 160° in order to photograph a crowd, city roads, landscapes and the like while a reflector-rotary type camera can take a photograph over an entire field, that is over a 360° angle at a signal actuation.

Generally, panorama cameras are especially made particularly since the demand of consumers is limited. Accordingly, it has been known to provide a conventional type camera with an attachment to permit panorama photographing. For example, as illustrated in FIG. 14, a camera capable of taking a panorama photograph has been provided with a panorama adaptor 104 which is removably mounted on a rear end of a lens, that is, within guide walls 103a, 103b that are adapted to guide a film therebetween. Usually, both ends of the panorama adaptor 104 are bent to form fixing portions 104a, 104b which can resiliently grip the camera body in order to prevent the separation of the adaptor from the camera body.

In order to take panorama photographs, a user inevitably opens a rear cover (unillustrated), attaches the panorama adapter 104 to the guide walls 103a, 103b by pressing with a certain pressure, before inserting a film 101, thereafter, inserts a film and shuts the rear cover. When an aimed panorama mode is selected, the upper and the lower parts of an image of objects entering through the lens 100 are trimmed by the panorama adapter as shown in FIG. 15, whereby a panorama photographic mode can be obtained.

As noted above, since a user must open a rear cover to attach the panorama adapter 104 before inserting a film 101, it is impossible to take panorama photographs while a film is inserted. Also, once the panorama adapter is attached, a user inevitably takes panorama photographs during a roll of film. Thus, the user cannot take a photograph at a chosen mode and at chosen moment in time.

To solve these problems, a conversion system has been proposed to be able to convert modes from the outer side of a camera body, of course, without opening a rear cover. However, this conversion system does not have a first photographic mode. Hence, a user is not able to select from several photographic modes. Especially, since this system does not have a structure of linking to a finder assembly, a photographic mode of the finder assembly cannot be selected according to the selection of photographic mode, it is so difficult to select a range of picture composition that a desired picture cannot be obtained. Particularly, since the conversion system does not cooperates with a finder system and a photographic mode selection of a finder is not made, it is difficult to select a range of composition of photograph. As a result, the user may not obtain an intended photograph.

SUMMARY OF THE INVENTION

It is an object of the invention to provide a conversion system for a camera capable of converting to various modes from the outer side of a camera body without opening a rear cover even while a film is inserted, and especially to a first photographic mode of a photographic conversion system, and at the same time to a first photographic mode or a second photographic mode of a finder system to prevent a photographic mistake.

It is another object of the invention to incorporate a camera conversion system in a camera which can be operated from outside the camera body.

It is another object of the invention to provide a finder conversion system for a camera which is capable of identifying a normal photographic mode, a first photographic mode and a second photographic mode.

To accomplish the object of the present invention, a photographic mode conversion system comprises a cam plate mounted for horizontal movement in the camera body and having a cam slot in order to select one of a normal photographic mode, a first (high-vision) photographic mode and a second (panoramic) photographic mode. In addition, a conversion knob is connected to the cam plate and extends outwardly of the camera body, and a first panorama curtain is mounted in the camera body for vertical movement between a normal photographic mode position, a first photographic mode position and a second photographic mode position thereof. In addition, the conversion system employs a first operating lever which is pivotally mounted in the camera body and which is connected between the cam plate and the first panorama curtain in order to cause the first panorama curtain to move vertically in response to movement of the cam plate.

Still further, the conversion system employs a second panorama curtain mounted in the camera body for vertical movement between a normal photographic mode position, a first photographic mode position and a second photographic mode position thereof. A second operating lever which is pivotally mounted in the camera body is connected between the two curtains in order to move the second curtain vertically in opposition to and in response to vertical movement of the first curtain.

Movement of the conversion knob is carried out manually so as to shift the cam plate, for example, horizontally within the camera body so as to select one of the three photographic mode positions for the two panoramic curtains. The cam plate is interconnected with the first operating lever so that a horizontal movement of the cam plate causes a pivoting movement of the operating lever which, in turn, causes a vertical movement of the first curtain. The vertical movement of the second panorama curtain is effected via the pivoting movement of the second operating lever in dependence on the direction of vertical movement of the first curtain.

To accomplish another object of the present invention, a finder conversion system comprises a second cam plate connected to the cam plate of the photographic mode conversion system, and a pair of barriers rotated by a pair of arc shaped cam holes of the second cam plate for selectively converting a finder mode in accordance with the conversion of the photographic mode.

BRIEF DESCRIPTION OF THE DRAWINGS

These and other objects and advantages of the invention will become more apparent from the following detailed description taken in conjunction with the accompanying drawings wherein.

3

Figure 2:
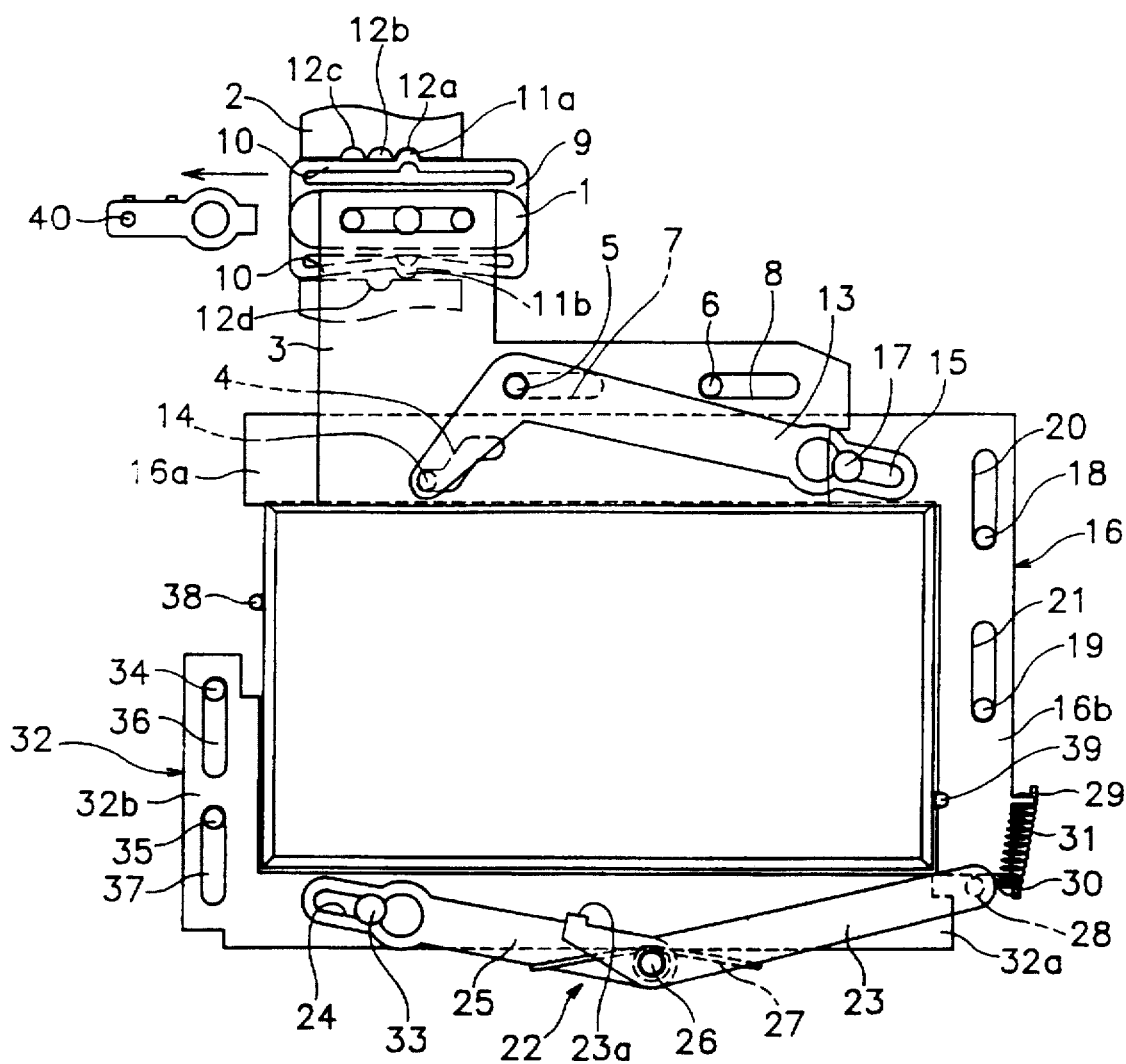
Figure 3:
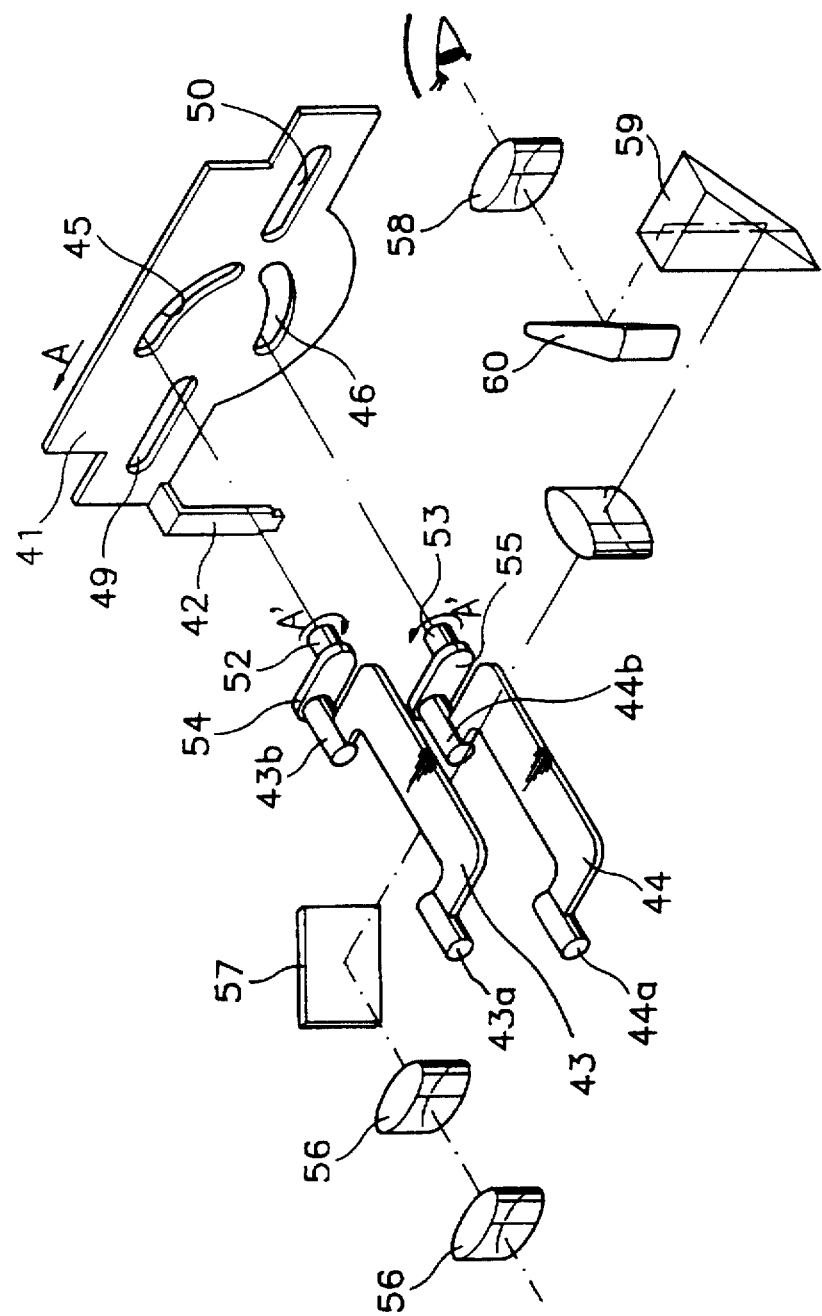
Figure 4:
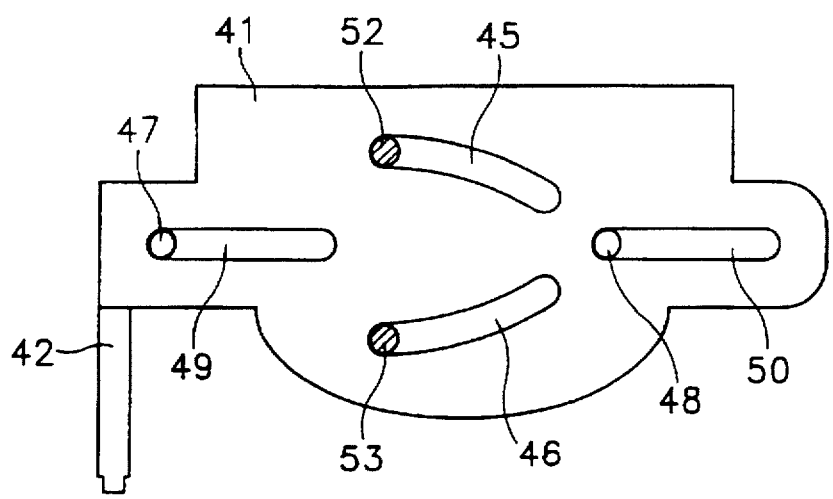
Figure 5:
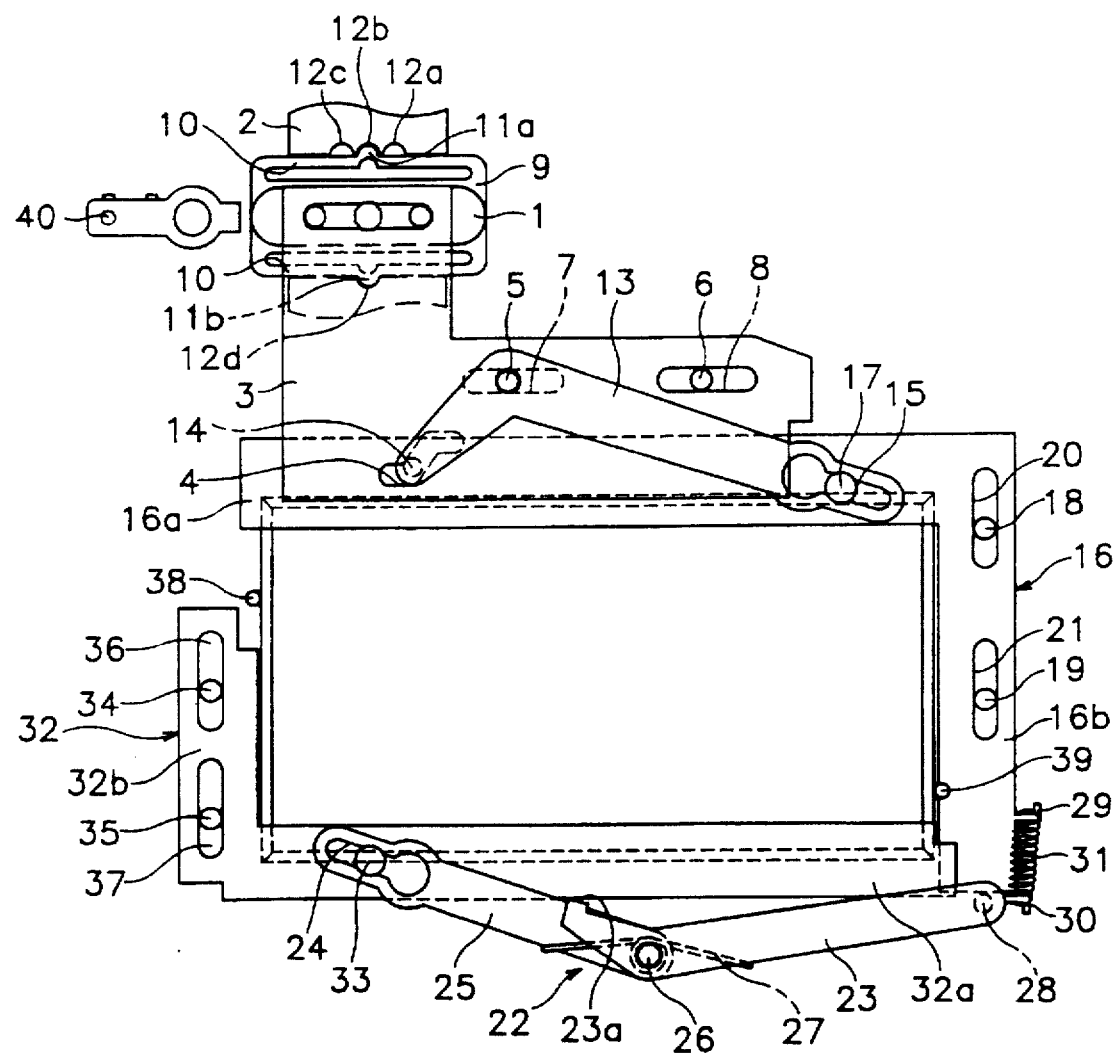
Figure 6:
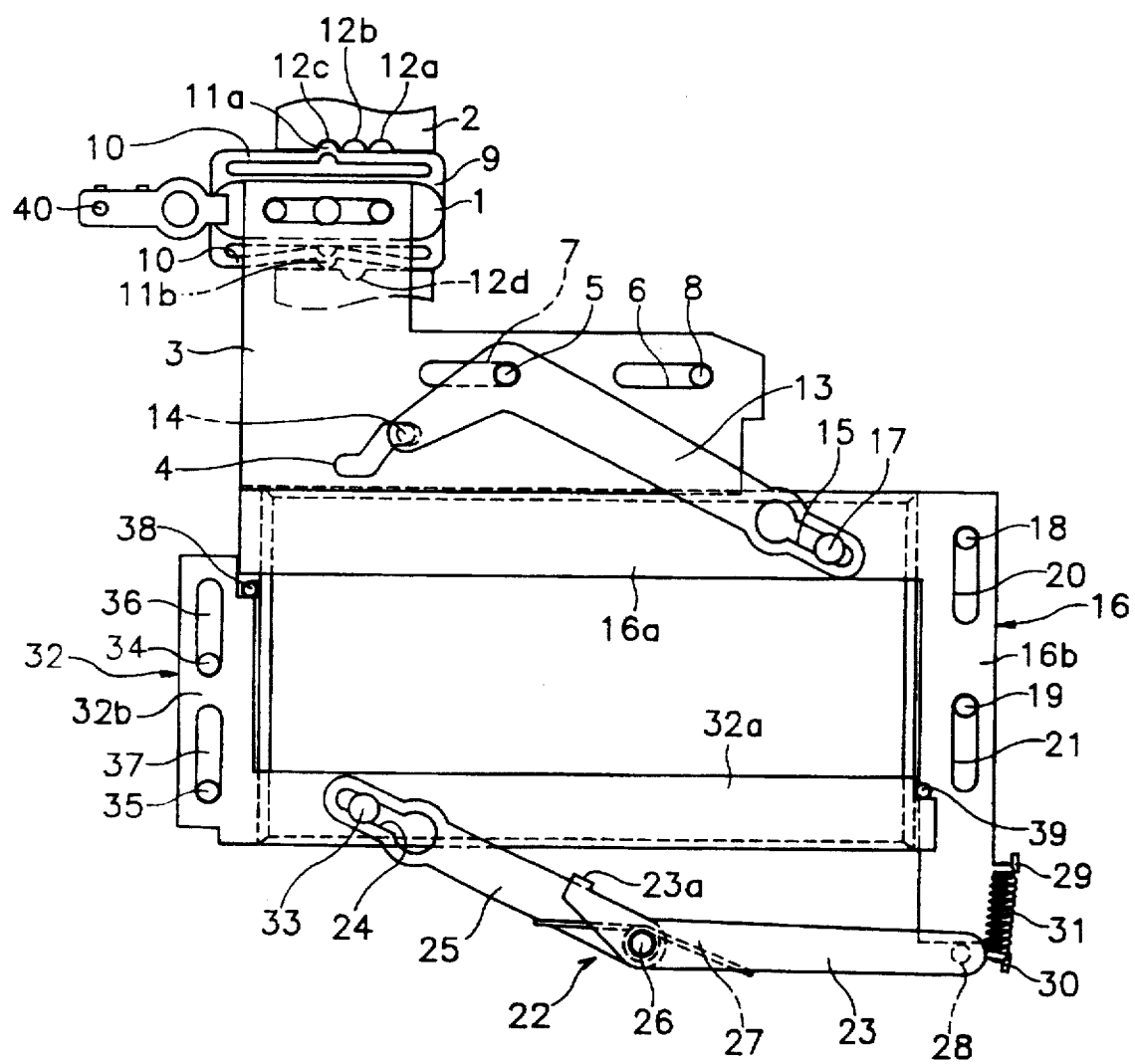
Figure 7:
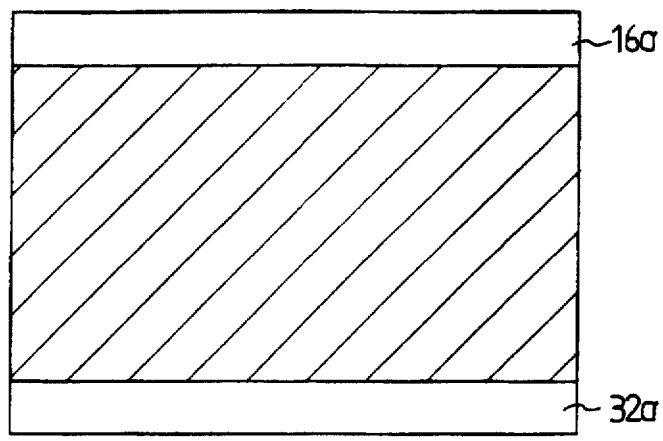
Figure 8:
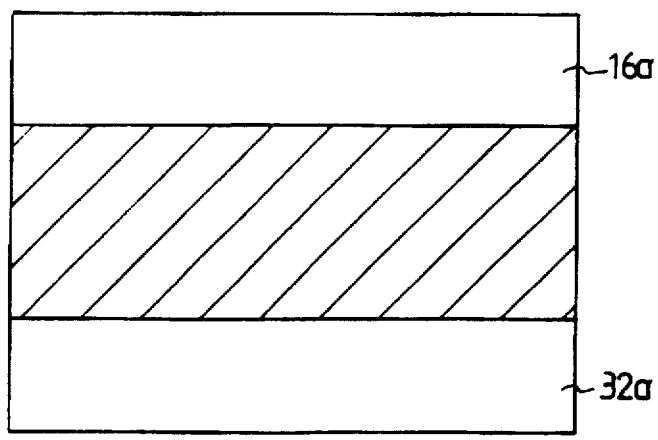
Figure 9:
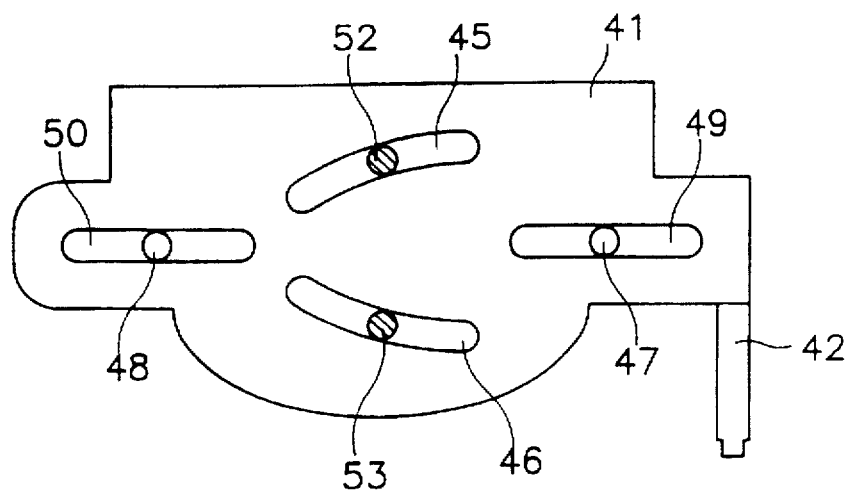
Figure 10:
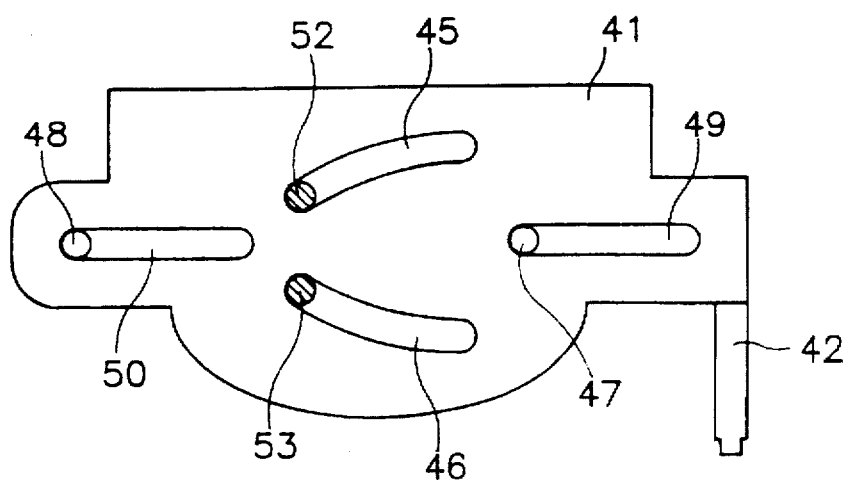
Figure 11:
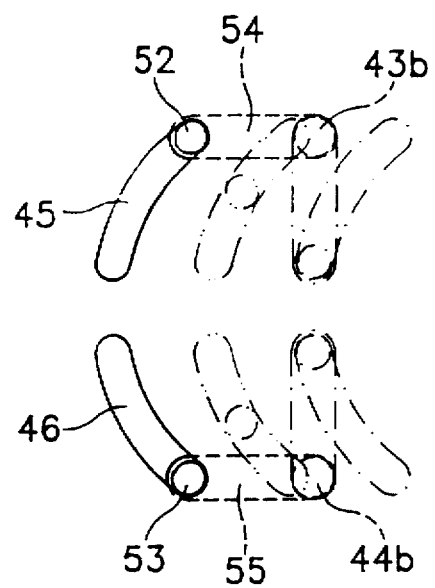
Figure 12:
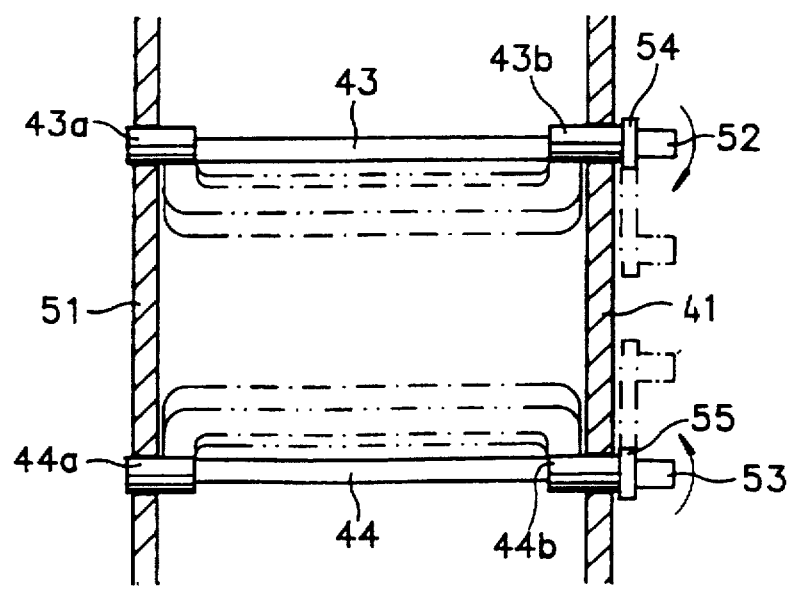
Figure 13:
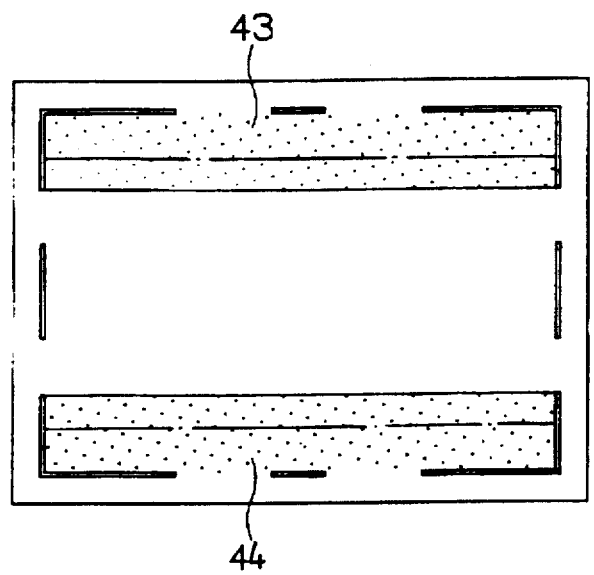
Figure 15:
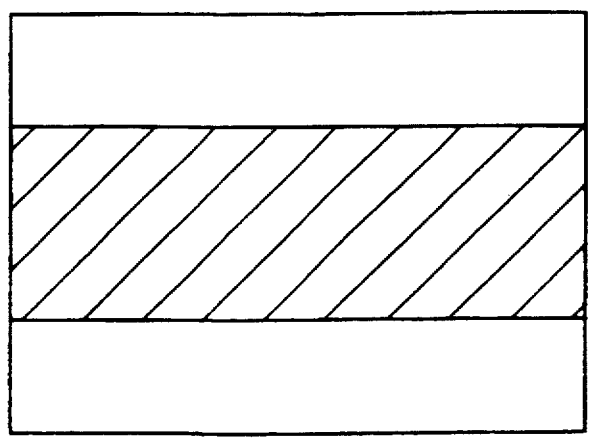
Figure 14:
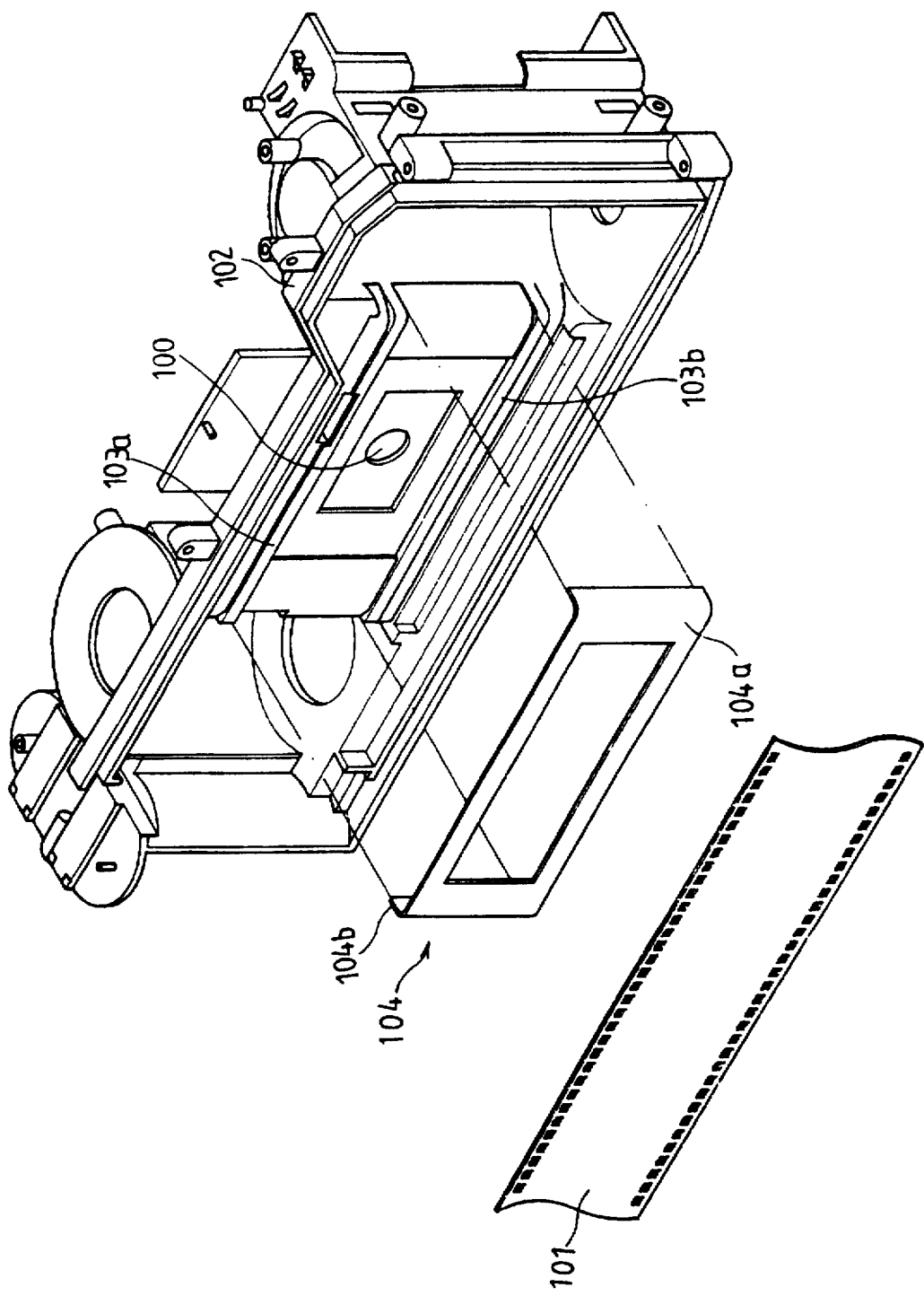

FIG. 2 is a front view illustrating a normal photographing state of the photographic mode conversion system in accordance with the invention;

FIG. 3 is an exploded perspective view of the finder conversion system for a camera in accordance with the invention;

FIG. 4 is a sectional view illustrating main portions of the finder conversion system in accordance with the invention;

FIG. 5 is a front view illustrating a first photographic state of the photographic mode conversion system in accordance with the invention;

FIG. 6 is a front view illustrating a second photographic state of the photographic mode conversion system in accordance with the invention;

FIG. 7 is a front view illustrating a first photographic mode of the photographic mode conversion system in accordance with the invention;

FIG. 8 is a front view illustrating a second photographic mode of the photographic mode conversion system in accordance with the invention;

FIG. 9 is a front view of a cam plate of the finder conversion system in a first photographic mode in accordance with the invention;

FIG. 10 is a front view of a cam plate of the finder conversion system in a second photographic mode in accordance with the invention;

FIG. 11 is a front view illustrating an operation state of the operating levers of the finder system in accordance with the invention;

FIG. 12 is a cross sectional view illustrating an operation state of the barriers of the finder conversion system in accordance with the invention;

FIG. 13 is a view illustrating a photographic mode of the finder conversion system in accordance with the invention;

FIG. 14 is an exploded perspective view of a panorama camera in accordance with the conventional art; and FIG. 15 is a trimmed figure in a second photographic mode of the conventional panorama camera.

DETAILED DESCRIPTION OF THE PREFERRED EMBODIMENTS

Figure 1:
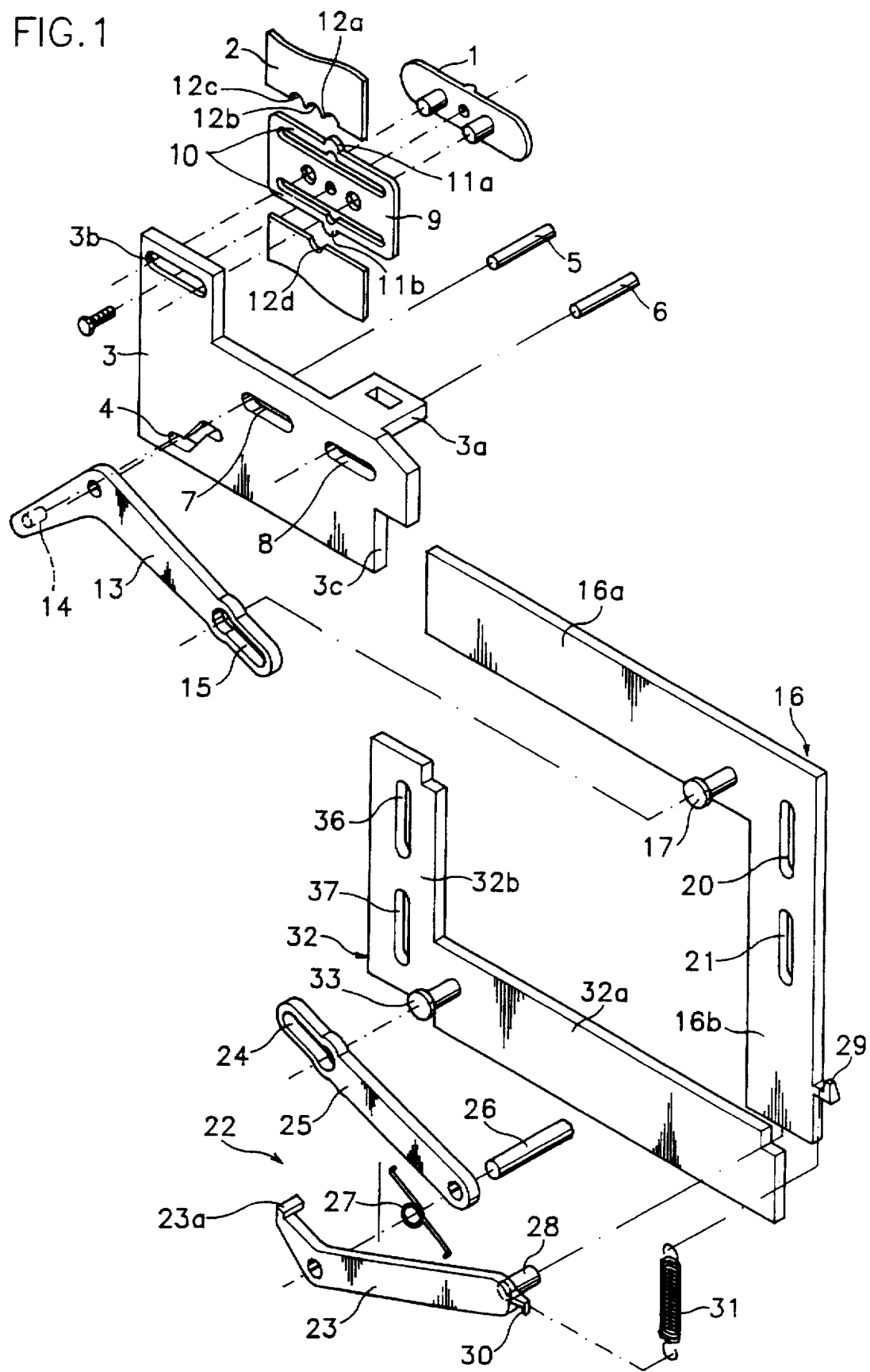
FIG. 1 is an exploded perspective view of a photographic mode conversion system of a conversion system for a camera in accordance with the invention.

Referring to FIGS. 1 and 2, the photographic mode conversion system for a camera (not shown in detail) includes a cam plate 3 which is mounted in a camera body (not shown) for horizontal movement between a normal photographic mode position, a first photographic mode (for example, a high vision photographic mode) position and a second photographic mode (for example, a panoramic photographic mode) position. As illustrated, the cam plate 3 has an elongated slot 3b disposed in a vertically projecting portion of the cam plate 3. In addition, a conversion knob 1 is secured to the cam plate 3 via a threaded screw which passes through the elongated slot 3b into threaded engagement with the conversion knob 1. Thus, movement of the conversion knob 1 in a horizontal path causes movement of the cam plate 3. Also, the cam plate 3 has a connecting plate 3a formed on one side thereof to cooperate with a finder conversion system.

As shown in FIG. 1, a conversion plate 9 is secured between the conversion knob 1 and the cam plate 3. To this end, the conversion plate 9 is provided with three apertures, a central one of which provides for passage of the threaded screw which secures the conversion knob 1 to the cam plate 3. A pair of pins on the conversion knob 1 pass through the outer apertures of the conversion plate 9. In this way, the conversion plate 9 also moves with the conversion knob 1 and cam plate 3.

As illustrated, the conversion plate 9 has a pair of elongated horizontally disposed slots formed at an upper part and a lower part respectively so that a pair of flexible strips 10 are provided along the upper and lower edges of the conversion plate 9. As shown in FIGS. 1 and 2, projections 11a, 11b are formed on the upper and the lower strips 10 respectively. In addition, the conversion plate 9 slides between two guide ways of the camera body 2 wherein each guide way is provided with one or more recesses 12a, 12b, 12c and 12d, respectively for receiving the respective projections 11a, 11b of the conversion plate 9. For example, the three recesses 12a, 12b, 12c in the upper guide way represent a second photographic mode position, a first photographic mode position and a normal photographic mode position, respectively, of the camera. The recess 12d in the lower guide way to receive the lower projection 11b of the conversion plate 9 is aligned with the middle recess 12b for the normal photographic mode position.

As shown in FIG. 1, the cam plate 3 is provided with a pair of elongated horizontal slots 7, 8 which slidably receive pins 5, 6 fixed on the camera body (not shown). These pins 5, 6 serve to guide the cam plate 3 in a horizontal direction. In addition, the cam plate 3 is provided with a cam slot 4. This cam slot 4 has a pair of horizontal portions which are vertically spaced from each other and an inclined portion connecting the horizontal portions. In addition, the cam plate 3 is provided with a recess 3c on the righthand side as viewed for purposes as explained below.

The photographic mode conversion system also includes a first operating lever 13 which is pivotally mounted on the fixed pin 5 of the camera body in order to pivot thereon. This lever 13 is of double arm type and has a transversely disposed guide projection 14 formed at the end of one arm for slidably locating within the cam slot 4 of the cam plate 3 and has an elongated slot 15 formed at the end of the other arm. The guide projection 14 is located in the lower horizontal portion of the cam slot 4 in the normal photographic mode position, the inclined portion in the first photographic mode position and in the upper horizontal portion in the second photographic mode position, respectively.

The photographic mode conversion system also includes a first panorama curtain 16 which is mounted within the camera body for vertical movement between a normal photographic mode position (see FIG. 2), a first photographic mode position (see FIG. 7), and a second mode position (see FIG. 8). As shown, the first panorama curtain 16 is of L-shape with a horizontal part 16a for trimming an upper side of an image of an object and a vertical part 16b having a pair of vertically elongated guide slots 20, 21 for receiving a pair of guide pins 18, 19 (see FIG. 2) fixed on the camera body (not shown). The first panorama curtain 16 also has a guide projection 17 which is slidably received within the elongated slot 15 of the first operating lever 13 (see FIG. 2). As indicated, the guide projection 17 has an enlarged head to prevent separation of the first panorama curtain 16 from the operating lever 13. The stepped recess portion 3c of the cam plate 3 serves to prevent interference of the cam plate 3 with the guide projection 17 as indicated in FIG. 2.

The photographic mode conversion system also has a second panorama curtain 32 mounted within the camera body for vertical movement between a normal photographic mode position (see FIG. 2), a first photographic mode position (see FIG. 7) and a second mode position (see FIG.

8). As indicated, the second panorama curtain 32 has a horizontal part 32a for trimming a lower side of an image of an object and a vertical part 32b having a pair of vertically elongated guide slots 36, 37 for receiving a pair of guide pins 34, 35 (see FIG. 2) fixed on the camera body (not shown). The second panorama curtain 32 also has a guide projection 33 with an enlarged head.

Still further, the photographic mode conversion system has a second operating lever 22 which is mounted on the camera body on a fixed pivot axis defined by a pin 26 fixed on the camera body (not shown). This second operating lever 22 is connected to the two panorama curtains 16, 32 so as to move the second panorama curtain 32 vertically in response to vertical movement of the first panorama curtain 16. As indicated, the second operating lever 22 is formed by first and second links 23, 25. The first link 23 is pivotally mounted on the fixed pivot pin 26 within the camera body and has a guide projection 28 at one end which is in contact with a lower end of the vertical part 16b of the first panorama curtain 16. As indicated, the vertical part 16b of the first panorama curtain 16 has a projection 29 extending therefrom and the first link 23 has a corresponding projection 30. In addition, a spring 31 is mounted between the two projections 29, 30 so as to maintain contact state between the projection 28 of the first link 23 and the lower end of the vertical part 16a of the first panorama curtain 16.

The first link 23 also has a positioning projection 23a at one end which overlaps the second link 25 as indicated in FIG. 2.

The second link 25 is also pivotally mounted on the fixed pivot pin 26 and has an elongated slot 24 at the free end which slidably receives the guide projection 33 of the second panorama curtain 32. An enlarged head on the guide projection 33 prevents separation of the second link 25 from the second panorama curtain 32.

A torsion spring 27 is also mounted about the fixed pin 26 between the links 23, 25 in order to connect the links 23, 25 together to move in coordinated fashion.

In order to ensure the stability of a picture size and the photographic mode conversion system, the momentum of the first link 23 is larger than that of the second link 25 depending on the length ratio of the first link 23 with respect to the second link 25. That is to say, because the momenta of each link 23, 25 are different from each other, the positioning projection 23a of the first link 23 is separated from the second link 25 and the second link 25 rotates via the resiliency of the torsion spring 27. Then, associated with the guide projection 33 guided along the guide slot 24 of the second link 25, the second panorama curtain 32 is lifted up. As a result, the vertical momenta of each panorama curtain 16, 32 are limited regularly.

Guide rails may take the place of the elongated guide slots 20, 21; 36, 37 in the vertical portions of the respective curtains 16, 32. Corresponding guide rails may also be formed on the camera body. As indicated, the pairs of elongated slots 20, 21; 36, 37 are positioned opposite to each other.

Referring to FIG. 2, a pair of stoppers 38, 39 are mounted on the camera body to limit vertical movement of the respective curtains 16, 32 in the second photograpic mode. In addition, a switch 40 is provided for activating a light emitting diode to indicate movement of the conversion knob 1 to the second mode position (see FIG. 8).

Referring to FIGS. 3 and 4, a finder conversion system is operated by the conversion knob 1 and the conversion plate 9. The connecting plate 3a of the cam plate 3 cooperates with a cam plate 41 of the finder conversion system.

Further, in order to connect the cam plate 3 with the cam plate 41 for the finder, a connecting plate 3a formed on the cam plate 3 and a connecting projection 42 formed on the cam plate 41 for the finder are used. That is, the connecting projection 42 of the cam plate 41 is inserted in a hole formed in the connecting plate 3a of the cam plate 3 of the photographic mode conversion system.

The cam plate 41 is the finder conversion system includes a pair of cam holes (or slots) 45, 46 which face each other to guide a pair of barriers 43, 44 for selectively converting the photograph mode of the finder conversion system.

In this embodiment, a plurality of guide pulls 49, 50 are formed in the cam plate 41 to receive and be guided by guide pins 47, 48 formed on the camera body for a horizontal movement of the cam plate 41.

The cam holes 45, 46 of the cam plate 41 have an arc-shape and are formed such that the ends closest to the cam holes 50, 51 are closer to each other and the other sides of the cam holes 45, 46 are far from each other.

The barriers 43, 44 guided by the cam holes 45, 46 of the cam plate 41 of the finder conversion system are rotatably located between a finder housing 51 and the cam plate 41(see FIG. 12) and convert a photographic mode of the finder.

That is, guide projections 43a, 43b, 44a, 44b are formed at both ends of the barriers 43, 44 and guide projections 43a, 44b of each barrier 43, 44 are rotatably inserted in holes of the finder housing 51. Operating levers 53, 54 having insertion projections 52, 53 are formed at the guide projections 43b, 44b, and insertion projections 52, 53 are inserted in the cam holes 45, 46 of the cam plate 41, respectively. Therefore the barriers 43, 44 can be rotated respectively about axis of the guide projections 43a, 43b, 44a, 44b. When the cam plate 41 moves horizontally to direction "A" (in FIG. 3), the insertion projections 52, 53 are rotated in direction "A" (in FIG. 3) by the arc shape of the cam holes 45, 46, consequently the barriers 43, 44 rotate in a direction "A". Therefore the conversion effect, first or second photographic mode, of the finder can be obtained.

On the other hand, the finder has a prism 59 and a mirror 60 to reflect to an eyepiece lens 58 light which becomes incident through each lens 56, of which an incident angle is changed to orthogonal by a mirror 57 disposed in an angle of 45 degrees, and passes through a finder path between the barriers 43, 44.

Referring to FIG. 2, when the camera is in the normal photographic mode position, the projection 11a formed on the upper edge of the conversion plate 9 is located within the recess 12c and the flexible strip 10 on the lower edge is flexed upwardly. Should a user intend to take a high vision photograph with a film inserted in the camera, the conversion knob 1 is pushed to the left as viewed into the position as indicated in FIG. 5. In this position, the projections 11a, 11b of the conversion plate 9 are received in the respective recesses 12b, 12d of the camera body. During this time, the cam plate 3 slides to the left so that the guide projection 14 on the first operating lever 13 moves into the inclined portion of the cam slot 4. At the same time, the first operating lever 13 is pivoted about the fixed pin 5 so that the guide projection 17 is forced vertically downwardly. As a result, the first panorama curtain 16 moves vertically downwardly being guided on the pins 18, 19. At the same time, a lower end of the vertical part 16a of the first panorama curtain 16 presses down the guide projection 28, therefore, the first link 23 rotates about the axis of the pin 26 in a clockwise direction, as viewed. Consequently, via the torsion spring 27, the second link 25 rotates about the axis of the pin 26 in a clockwise direction, therefore, the second panorama curtain 32 moves vertically upwardly along the guide pins 34, 35. Should an image be taken in this position, the image would appear as indicated in FIG. 7 with trimmed upper and lower edges.

Referring to FIGS. 9, 11 and 12, since the cam plate 41 for the finder conversion system cooperates with the cam plate 3 via the connecting projection 42 connected to the connecting plate 3a of the cam plate 3, the cam plate 3 is moved horizontally along the guide pins 47, 48 by a movement of the cam plate 3 of the photographic conversion system.

Therefore, the insertion projections 52, 53 inserted into the cam holes 45, 46 of the cam plate 41 are guided and the operating levers 54, 55 rotate to the arc shape of the cam holes 45, 46. Also, the pair of barriers 43, 44 rotate about the axis of the guide projections 43a, 44b and 44a, 44b in opposite direction to each other as shown with two dots dash line of FIG. 12. Therefore, with the first mode formed on the eyepiece lens 58 by the pair of barriers 43, 44 as shown with two dots dash line of FIG. 13, the user can identify the range of composition of the object through the finder.

Should the user wish to take a panoramic photograph, the conversion knob 1 is moved farther to the left position as illustrated in FIG. 6. At this time, the projection 11a of the conversion plate 9 received in the recess 12a and the conversion knob 1 contacts with the switch 40 so that a light emitting diode is turned ON to confirm that the selected mode has been obtained.

At the same time, the cam plate 3 moves farther to the left, and the guide projection 14 on the first operating lever 13 locates in the upper horizontal portion of the cam slot 4 by moving of the cam plate 3. The first operating lever 13 rotates about the axis of the fixed pin 5 in the clockwise direction, therefore, the first panorama curtain 16 moves further downwardly until the guide pins 18, 19 of the camera body contact with the upper ends of the elongated guide slots 20, 21 of the first panorama curtain 16. On the other hand, the lower end of the vertical part 16b of the first panorama curtain 16 presses down the guide projection 28 of the first link 28, therefore, the first link rotates farther about the axis of the pin 26 in the clockwise direction. Consequently the second link 25 rotates about the axis of the pin 26 in the clockwise direction by the torsion spring 27. Therefore, the second panorama curtain 32 is further raised until the guide pins 34, 35 of the camera body contact with the lower ends of the elongated guide slots 36, 37 of the second panorama curtain 32. Should an image be taken at this time, the image would appear as shown in FIG. 8 with further trimmed upper and lower edges than those of FIG. 7.

Referring to FIGS. 10, 11 and 12, at the same time, the cam plate 41 of the finder conversion system further moves horizontally along the guide pins 47, 48 via the connecting projection 42 and the connecting plate 3a of the cam plate 3 of the photographic conversion system. Therefore, the insertion projections 52, 53 inserted into the cam holes 45, 46 of the cam plate 41 are guided (as shown in FIG. 10) and the operating levers 54, 55 further rotate to the arrow direction of FIG. 12 via the arc shape of the cam holes 45, 46. Also, the pair of barriers 43, 44 rotate about the axis of the guide projections 43a, 43b and 44a, 44b in opposition direction to each other as shown with one dot dash line of FIG. 12. Therefore, the second photographic mode is formed on the eyepiece lens 58 by the pair of barriers 43, 44 as shown with solid line of FIG. 13, and the user can identify the range of composition of the object through the finder.

Thereafter, the conversion knob 1 can be slid back to the initial position to permit the taking of photographs in the normal photographic mode. Through the opposite process, the two panoramic curtains 16, 32 are returned to the initial state as shown in FIG. 2. At the same time the photographic mode of the finder conversion system is converted to the normal photographic mode as the pair of barriers 43, 44 are rotated to the initial state.

As described above, the conversion system of the present invention can be readily mounted in a camera, for example, between a lens and a film, and can be not only actuated from outside of the camera but also transferred from a photographic mode (normal photographic mode, first photographic mode) to another photographic mode (first photographic mode, second photographic mode) without opening a rear cover.

Since the pair of barriers of the finder conversion system are connected to the cam plate of the photographic mode conversion system, the user can select a desired photographic mode and can identify the range of composition of the object through the finder.

What is claimed is:

1. A photographic mode conversion system for a camera comprising
   a conversion knob movably mounted in a camera body and extended outwardly of the camera body;
   a cam plate movably mounted in the camera body for a linear movement and connected to said conversion knob;
   A first operating lever rotatably mounted about a first fixed pivot pin and connected to said cam plate for rotation in response to the movement of said cam plate;
   a first panorama curtain connected to said first operating lever for a vertical movement in response to rotation of said first operating lever;
   a second operating lever rotatably mounted about a second fixed pivot pin and contacted to said first panorama curtain for rotation in response to the vertical movement of said first panorama curtain;
   a second panorama curtain connected to said second operating lever for movement in response to rotation of said second operating lever, whereby upon linear movement of said conversion knob and said cam plate, said first and second panorama curtains are moved in opposite directions to each other and a photographic mode is changed; and
   a conversion plate secured between said conversion knob and said cam plate for selectively engaging with the camera body, said conversion plate having a first projection on an upper end for resiliently engaging in one of three grooves in the camera body corresponding to said mode positions of said cam plate and a second projection on a lower end for resiliently engaging in a fourth groove in the camera body.

2. A system as set forth in claim 1 which further comprises a conversion plate secured between said conversion knob and said cam plate for selectively engaging with the camera body.

3. A system as set forth in claim 1 wherein said cam plate has a vertically projecting portion connected to said conversion knob.

4. A system as set forth in claim 1 wherein said first panorama curtain has a guide projection slidably received in an elongated slot formed at an end of said first lever and said cam plate has a stepped end to prevent interference with said guide projection of said first curtain.

5. A system as set forth in claim 1 wherein said cam plate has a pair of horizontally elongated guide slots for receiving guide pins fixed on the camera body.

6. A system as set forth in claim 1 which further comprises a switch for activating a light emitting diode to indicate movement of said conversion knob to said second mode position.

7. In combination, a camera body; and a photographic mode conversion system for selecting one of a normal photographic mode, a first photographic mode and a second photographic mode; said system including a cam plate mounted for horizontal movement in said camera body, said cam plate including a cam slot having a pair of vertically spaced horizontal portions and an inclined portion connecting said horizontal portions;

a conversion knob connected to said cam plate and extending outwardly of said camera body;

a first panorama curtain mounted in said camera body for vertical movement between a normal photographic mode position, a first photographic mode position and a second photographic mode position thereof;

a first operating lever pivotally mounted in said camera body and connected between said cam plate and said first curtain to cause said first curtain to move vertically in response to movement of said cam plate, said first lever including a guide projection slidably received in said cam slot whereby said projection occupies one of said horizontal portions in one of said normal photographic mode position and said second photographic mode position and said second photographic mode position and occupies said inclined position in said first photographic mode position;

a second panorama curtain mounted in said camera body for vertical movement between a normal photographic mode position, a first photographic mode position and a second photographic mode position thereof; and a second operating lever pivotally mounted in said camera body and connected between said first panorama curtain and said second curtain to move said second curtain vertically in opposition to and in response to vertical movement of said first panorama curtain.

8. A finder conversion system for a camera comprising a finder housing;

a conversion knob extending outwardly of said camera body;

a first cam plate connected to said knob for movement therewith for selectively converting a photographic mode conversion system, said cam plate having a connecting plate thereon;

a second cam plate connected to said connecting plate of said first cam plate for horizontal movement therewith, said second cam plate having a pair of cam holes facing each other; and a pair of barriers respectively guided in said cam holes and mounted in said finder housing for selectively converting to one of said selected photographic modes.

9. A system as set forth in claim 8 wherein said second cam plate includes a fixed projection inserted in a hole formed in said connecting plate.

10. A system as set forth in claim 8 wherein said first cam plate includes a plurality of guide slots guided by pins formed on the camera body for horizontal movement.

11. A system as set forth in claim 8 wherein said pair of cam hole is disposed such that their one ends are close to each other and their other ends are far from each other for guiding the pair of barriers in opposite directions to each other.

12. A system as set forth in claim 8 wherein each said fair of cam holes have an arc shape.

13. A system as set forth in claim 8 wherein each barrier has a pair of guide projections formed at both ends thereof, an operating lever mounted on one of said guide projections, and an insertion projection mounted on said operating lever, said guide projection and said insertion projection of each barrier being inserted in said finder housing and a respective cam hole of said second cam plate respectively, whereby upon linear movement of said second cam plate, said pair of barriers are rotated about axes of said pair of guide projections.

14. A system as set forth in claim 8 which further includes a lens for receiving light, a mirror for reflecting light from said lens into a path passing between said pair of barriers, an eyepiece lens and a prism to reflect the light passing between said pair of barriers to said eyepiece lens.

15. A photographic mode conversion system for a camera comprising a conversion knob movably mounted in a camera body and extended outwardly of the camera body;

a cam plate movably mounted in the camera body for a linear movement and connected to said conversion knob, said cam plate including a cam slot having a pair of horizontal portions vertically spaced from each other and an inclined portion connecting said horizontal portions;

a first operating lever rotatably mounted about a first fixed pivot pin and connected to said cam plate for rotation in response to the movement of said cam plate, said first lever including a guide projection slidably received in said cam slot whereby said projection is received in one of said horizontal portions in one of a normal photographing mode position and a first photographic mode position and is received in said inclined position of said cam slot in a second photographic mode position;

a first panorama curtain connected to said first operating lever for a vertical movement in response to rotation of said first operating lever;

a second operating lever rotatably mounted about a second fixed pivot pin and contacted to said first panorama curtain for rotation in response to the vertical movement of said first panorama curtain; and a second panorama curtain connected to said second operating lever for movement in response to rotation of said second operating lever, whereby upon linear movement of said conversion knob and said cam plate, said first and second panorama curtains are moved in opposite directions to each other and a photographic mode is changed.

16. A photographic mode conversion system for a camera comprising a conversion knob movably mounted in a camera body and extended outwardly of the camera body;

a cam plate movably mounted in the camera body for a linear movement and connected to said conversion knob;

a first operating lever rotatably mounted about a first fixed pivot pin and connected to said cam plate for rotation in response to the movement of said cam plate;

a first panorama curtain connected to said first operating lever for a vertical movement in response to rotation of said first operating lever, said first panorama curtain having a horizontal part for trimming an upper side of an image of an object and a vertical part having a pair of vertically elongated guide slots for receiving a pair of guide pins fixed on the camera body;

a second operating lever rotatably mounted about a second fixed pivot pin and contacted to said first panorama curtain for rotation in response to the vertical movement of said first panorama curtain; and a second panorama curtain connected to said second operating lever for movement in response to rotation of said second operating lever, whereby upon linear movement of said conversion knob and said cam plate, said first and second panorama curtains are moved in opposite directions to each other and a photographic mode is changed.

17. A photographic mode conversion system for a camera comprising;

a conversion knob movably mounted in a camera body and extended outwardly of the camera body;

a cam plate movably mounted in the camera body for a linear movement and connected to said conversion knob;

a first operating lever rotatably mounted about a first fixed pivot pin and connected to said cam plate for rotation in response to the movement of said cam plate;

a first panorama curtain connected to said first operating lever for a vertical movement in response to rotation of said first operating lever;

a second operating lever rotatably mounted about a second fixed pivot pin and contacted to said first panorama curtain for rotation in response to the vertical movement of said first panorama curtain, said second lever including a first link for pivotally mounting on a fixed pivot pin in the camera body and having one end contacting said first panorama curtain, a second link pivotally mounted on said fixed pivot pin and a torsion spring connecting said links together to move said links in coordinated fashion; and a second panorama curtain connected to one end of said second link of said second operating lever for movement in response to rotation of said second operating lever, whereby upon linear movement of said conversion knob and said cam plate, said first and second panorama curtains are moved in opposite directions to each other and a photographic mode is changed.

18. A system as set forth in claim 17 which further comprises a spring connected between said first link and said first panorama curtain for biasing said first link against said first panorama curtain.

19. A photographic mode conversion system for a camera comprising a conversion knob movably mounted in a camera body and extended outwardly of the camera body;

a cam plate movably mounted in the camera body for a linear movement and connected to said conversion knob;

a first operating lever rotatably mounted about a first fixed pivot pin and connected to said cam plate for rotation in response to the movement of said cam plate;

a first panorama curtain connected to said first operating lever for a vertical movement in response to rotation of said first operating lever;

a second operating lever rotatably mounted about a second fixed pivot pin and contacted to said first panorama curtain for rotation in response to the vertical movement of said first panorama curtain, and a second panorama curtain connected to one end of said second link of said second operating lever for movement in response to rotation of said second operating lever, whereby upon linear movement of said conversion knob and said cam plate, said first and second panorama curtains are moved in opposite directions to each other and a photographic mode is changed, said second panorama curtain having a horizontal part for trimming a lower side of an image of an object and a vertical part having a pair of vertically elongated guide slots for receiving a pair of guide pins fixed on the camera body.

20. A system as set forth in claim 19 wherein said second panorama curtain has a projection received in an elongated slot of said second lever and has an enlarged head to prevent separation from said elongated slot.

21. A system as set forth in claim 19 wherein said vertical part of said second panorama curtain is parallel with said vertical part of said first panorama curtain.

* * * * *